(12) United States Patent
Batmaz et al.

(10) Patent No.: US 9,572,366 B2
(45) Date of Patent: Feb. 21, 2017

(54) SYSTEMS AND METHODS FOR HEAT EXCHANGE

(75) Inventors: Ediz Batmaz, Grand Rapids, MI (US); Barbara Burzinski Hartliep, Spring Lake, MI (US); Ricardo Reyes-Trevino, Grand Rapids, MI (US); Ernst Beutler, Langnau (CH)

(73) Assignee: Nestec S.A., Vevey (CH)

( * ) Notice: Subject to any disclaimer, the term of this patent is extended or adjusted under 35 U.S.C. 154(b) by 298 days.

(21) Appl. No.: 14/007,263

(22) PCT Filed: Mar. 9, 2012

(86) PCT No.: PCT/US2012/028425
§ 371 (c)(1),
(2), (4) Date: Dec. 19, 2013

(87) PCT Pub. No.: WO2012/125440
PCT Pub. Date: Sep. 20, 2012

(65) Prior Publication Data
US 2014/0127365 A1    May 8, 2014

Related U.S. Application Data

(60) Provisional application No. 61/453,921, filed on Mar. 17, 2011.

(51) Int. Cl.
*F28F 27/00*    (2006.01)
*G05D 15/00*    (2006.01)
(Continued)

(52) U.S. Cl.
CPC ............... *A23L 3/22* (2013.01); *F28D 7/024* (2013.01); *A23C 3/045* (2013.01);
(Continued)

(58) Field of Classification Search
CPC ..... F28D 2021/0042; F28D 2021/0098; F28D 7/1615; F28D 7/163; F28D 1/047;
(Continued)

(56) References Cited

U.S. PATENT DOCUMENTS 1,791,468 A * 2/1931 Leonard ................ C13B 25/001
165/146
3,426,547 A * 2/1969 Foster ..................... F25B 15/06
62/101
(Continued)

OTHER PUBLICATIONS

International Search Report and Written Opinion dated May 21, 2012, filed in PCT Application No. PCT/US12/28425.
(Continued)

*Primary Examiner* — Allen Flanigan
*Assistant Examiner* — Jason Thompson
(74) *Attorney, Agent, or Firm* — Gary M. Lobel, Esq.

(57) ABSTRACT

Heat exchange devices, including aseptic cooler devices, and systems including same are provided. Methods of using heat exchange device are also provided. In a general embodiment, the present disclosure provides heat exchangers having an open chamber configuration and including a first section containing a cooling or heating media and a second section containing a food product. The first section includes a level detecting device that is configured to maintain a level of cooling or heating media in the first section, while preventing the cooling or heating media from pressurizing the first section. The open chamber configuration provides an air break at a top portion of the first section that ensures that the cooling or heating media entering the first section is at, or close to, atmospheric pressure.

8 Claims, 5 Drawing Sheets

(51) Int. Cl.
    *F25D 17/02*  (2006.01)
    *A23L 3/22*  (2006.01)
    *F28D 7/02*  (2006.01)
    *F28D 21/00*  (2006.01)
    *A23C 3/04*  (2006.01)
(52) U.S. Cl.
    CPC .. *F28D 2021/0042* (2013.01); *F28F 2265/12* (2013.01); *F28F 2265/14* (2013.01)
(58) Field of Classification Search
    CPC ........ F28D 1/0472; F28D 1/0477; F28D 7/02; F28D 7/024; F28D 7/04; F28F 2265/12; F28F 2265/14
    USPC ....... 62/185, 389–393, 396, 399, 79, 98, 99, 62/126; 137/386–451
    See application file for complete search history.

(56) References Cited

U.S. PATENT DOCUMENTS

| | | | | |
|---|---|---|---|---|
| 3,477,729 | A * | 11/1969 | Hershey | F16J 15/162 165/104.31 |
| 4,718,481 | A * | 1/1988 | Delatte | F17C 7/04 122/31.1 |
| 5,106,543 | A * | 4/1992 | Dodds | F28F 27/003 137/244 |
| 5,309,987 | A * | 5/1994 | Carlson | F28F 9/22 165/159 |
| 5,762,879 | A * | 6/1998 | Nomura | B01J 19/0013 165/301 |
| 6,561,266 | B1 * | 5/2003 | Ehrlicher | B01F 5/0656 165/160 |
| 2003/0034146 | A1 | 2/2003 | Kaufman | |
| 2006/0196631 | A1 * | 9/2006 | Small | F25D 16/00 165/10 |

OTHER PUBLICATIONS

Abstract for Publication No. JP2000-055441 A published Feb. 25, 2000.
Abstract for Publication No. JP2007-215447 published Aug. 30, 2007.

* cited by examiner

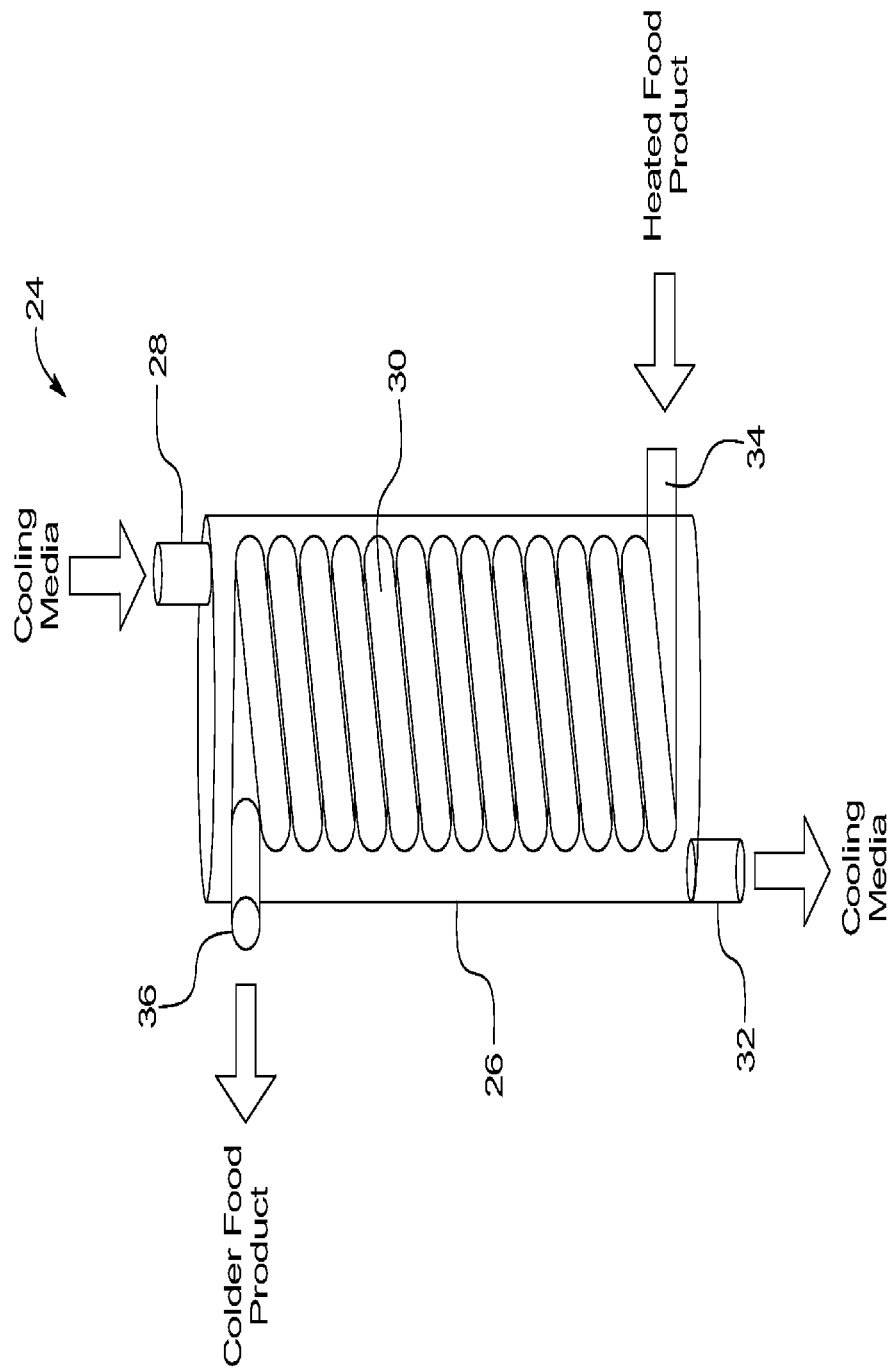

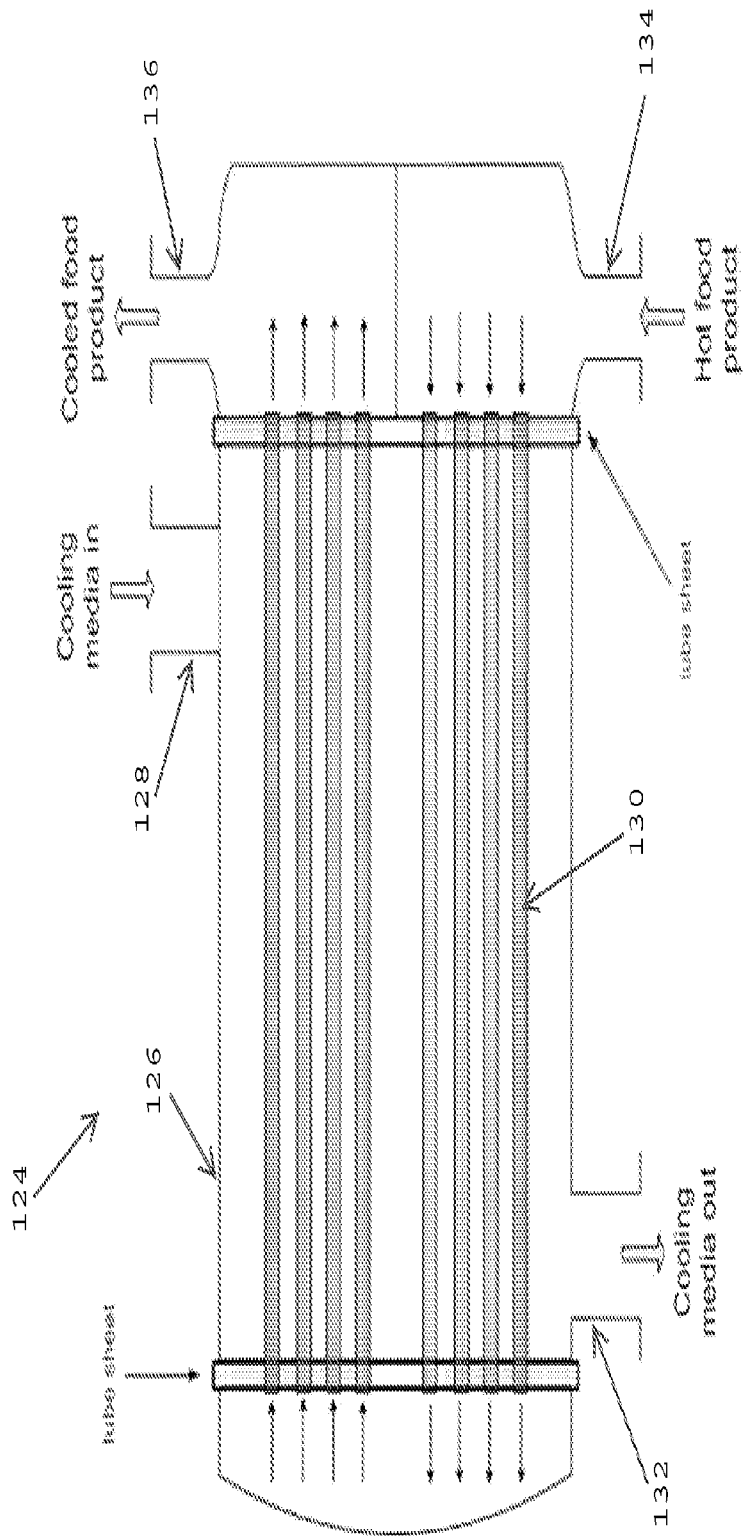

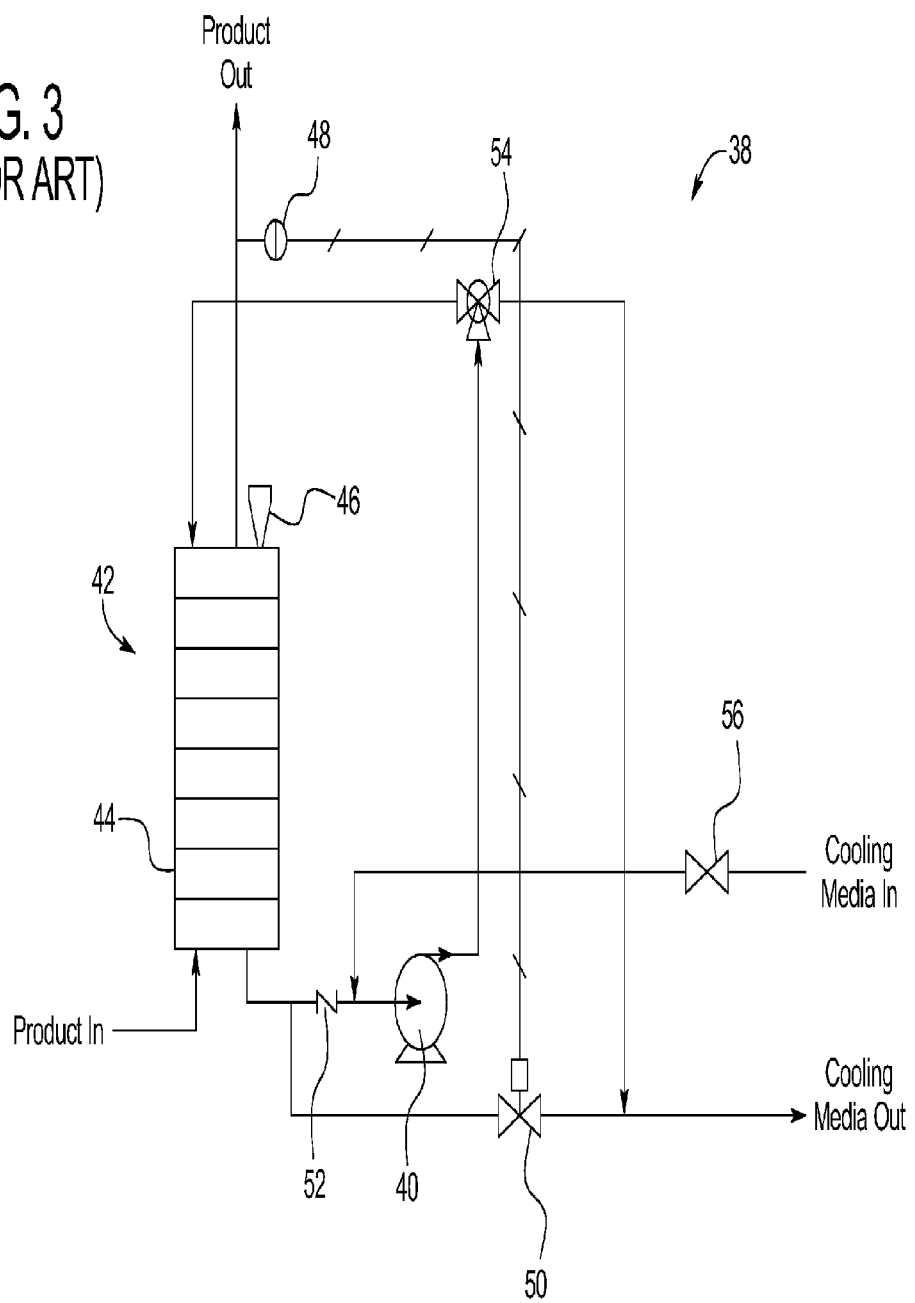

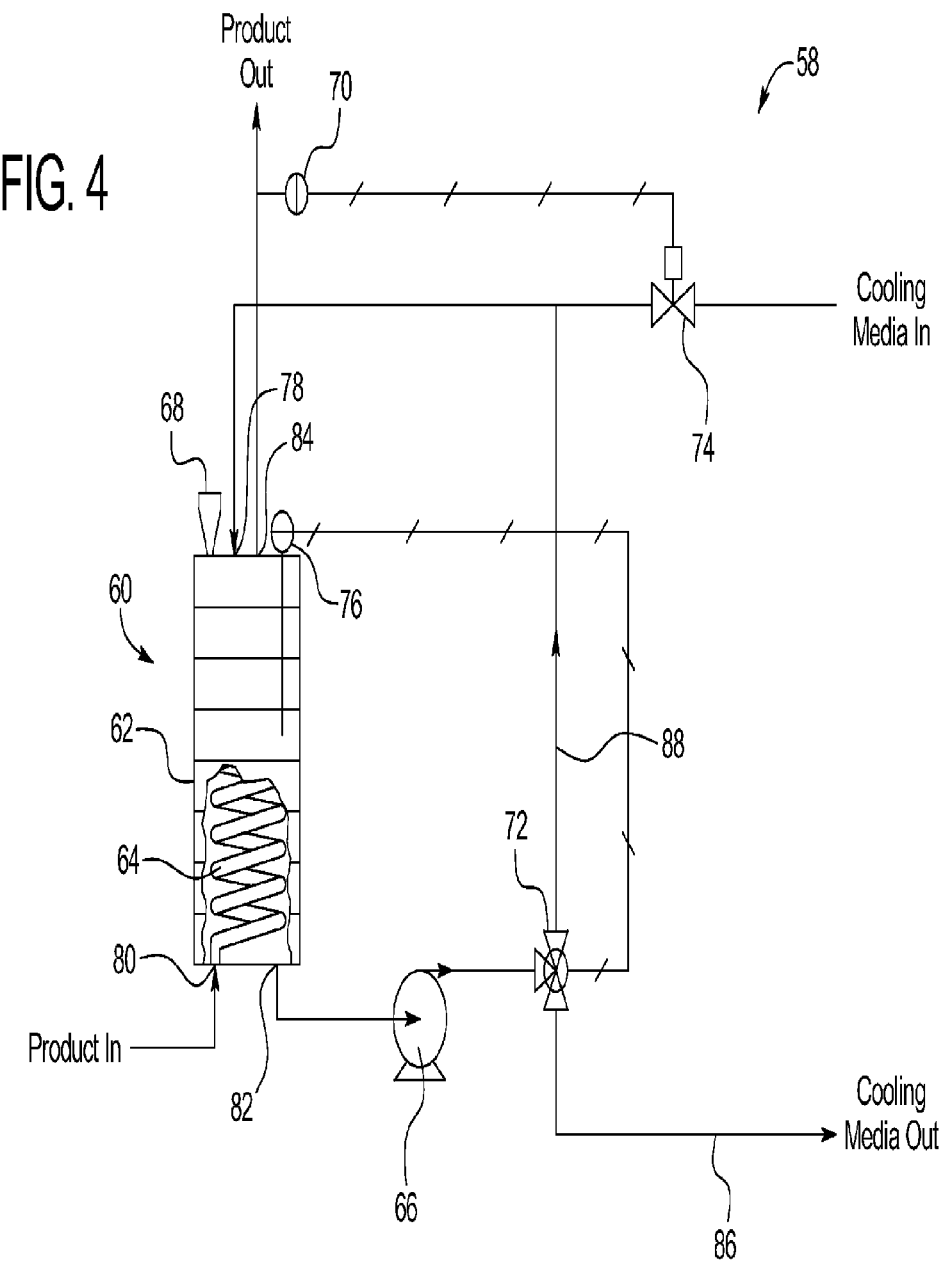

SYSTEMS AND METHODS FOR HEAT EXCHANGE

CROSS REFERENCE TO RELATED APPLICATIONS/INCORPORATION BY REFERENCE STATEMENT

This application is a national stage application filed under 35 USC §371 of App No. PCT/US12/28425, filed Mar. 9, 2012; which claims priority to U.S. Ser. No. 61/453,921, filed Mar. 17, 2011. The entire contents of the above-referenced patent applications are hereby expressly incorporated herein by reference.

BACKGROUND

The present disclosure generally relates to food technologies. More specifically, the present disclosure relates to a heat exchange apparatus, and in an embodiment, an, aseptic cooler having an open chamber configuration that allows for maintaining a level of cooling media in the aseptic cooler, while preventing the cooling media from pressurizing same.

Heat exchangers and aseptic coolers are known in the food industry and the common design for aseptic coolers is known as a "feed and bleed" system, which works by recirculating cooling media through the heat exchanger shell for heat transfer. The recirculating cooling media may be combined with fresh cooling media and pumped back to the heat exchanger shell by a circulation pump where it is introduced into the heat exchanger shell, which is typically flooded with cooling media. As such, the continuous and fast flow rate of cooling media into and through the heat exchanger shell pressurizes the chamber during recirculation. This pressurization is undesirable for aseptic food processing because higher pressure on the shell-side of the heat exchanger could force cooling media into the lower pressure tube-side of the heat exchanger in the presence of a pinhole or other failure, causing contamination of the food product contained therein.

SUMMARY

The present disclosure relates to heat exchanger to be used in the aseptic processing of food products; the heat exchanger having an open chamber configuration that allows for maintaining a level of cooling media in the aseptic cooler, while preventing the cooling media from pressurizing same. In an embodiment, the present disclosure relates to aseptic coolers having an open chamber configuration that allows for maintaining a level of cooling media in the aseptic cooler, while preventing the cooling media from pressurizing same. In an embodiment, a heat exchanger is provided. The heat exchanger has a chamber configured to contain a first composition and an amount of air, tubing located within the chamber and configured to contain a second composition, and a level element located within the chamber and configured to maintain a predetermined amount of the first composition within the chamber. The predetermined amount of the first composition corresponds to a level of the first composition that is from about 75% to about 95% of a height of the chamber.

In an embodiment, the level of the first composition is capable of operating within a range of about 20% to about 95% height, based on process needs.

In an embodiment, the level of the first composition is from about 50% to about 95% of the height of the chamber. The level of the first composition may also be about 80% to about 95% of the height of the chamber. The level of the first composition may also be about 85% to about 90% of the height of the chamber. The level of the first composition may also be about 80% of the height of the chamber. The level of the first composition may also be about 85% of the height of the chamber. The level of the first composition may also be about 90% of the height of the chamber.

In an embodiment, the air occupies about 5% to about 35% of a total interior volume of the chamber. The air may also occupy about 10% to about 20% of the total volume of the chamber. The air may also occupy about 15% of the total volume of the chamber.

In an embodiment, the level element is a capacitance level element. The level element may further be a grounded level element. The level element may further be a radar device. The level element may further be a guided radar device. The level element may further be an ultrasonic device. The level element may further be a hydrostatic pressure element. The level element may further be a differential pressure element. The level element may further be a radiometric element.

In an embodiment, the heat exchanger is an aseptic cooler.

In an embodiment, the heat exchanger is a heating apparatus.

In an embodiment, the first composition is a food grade coolant selected from the group consisting of water, propylene glycol, ethylene glycol, salt brine, synthetic hydrocarbon base chemicals from the polyalphaolefin family, vegetable extracts coolant. or combinations thereof.

In an embodiment, the first composition is a food grade coolant is propylene glycol.

In an embodiment, the first composition is a food grade coolant is ethylene glycol.

In an embodiment, the second composition is a food product. The second composition may include particulates. The second composition may be without particulates. The second composition may be substantially homogenous. The second composition may be heterogeneous.

In an embodiment, the chamber has a top end and a bottom end. The top end of the chamber may have a second composition outlet and a first composition inlet. Similarly, the bottom end of the chamber comprises a second composition inlet and a first composition outlet. The chamber may also have an air vent.

In an embodiment, the tubing has a shape that is selected from the group consisting of linear, helical, serpentine, or combinations thereof.

In another embodiment, a heat exchanger is provided. The heat exchanger includes a chamber configured to contain a first composition and an amount of air, tubing located within the chamber and configured to contain a second composition, and a sensor located within the chamber and configured to sense an amount of the first composition within the chamber. The amount of the first composition may correspond to a level of the first composition that is from about 75% to about 95% of a height of the chamber.

In an embodiment, the sensor senses an amount of pressure within the chamber.

In an embodiment, the sensor senses an amount of pressure of the first composition measured at the location where first composition pressure is at its highest value and the pressure of the second composition measured at the location where the second composition pressure is at its lowest value.

In an embodiment, a plurality of sensors sense a differential pressure. This differential pressure can be between the outside environment and a first chamber. Additionally, differential pressure is between the a first chamber and a second chamber.

In an embodiment, a second sensor is provided that is configured to sense an amount of pressure within the chamber.

In another embodiment, an aseptic food processing system includes a heating apparatus, a holding apparatus, and a cooling apparatus having a chamber configured to contain a first composition and an amount of air, tubing located within the chamber and configured to contain a second composition, and a level element located within the chamber and configured to maintain a predetermined amount of the first composition within the chamber. The predetermined amount of the first composition corresponds to a level of the first composition that is from about 75% to about 95% of a height of the chamber.

In an embodiment, the aseptic food processing system further includes a pre-heating apparatus.

In an embodiment, the aseptic food processing system further includes a pre-cooling apparatus.

In an embodiment, the system is a closed system.

In an embodiment, the aseptic food processing system further includes a temperature sensor. The temperature sensor may be a thermometer.

In an embodiment, the aseptic food processing system further includes a pump configured to circulate the first composition.

In an embodiment, the aseptic food processing system further includes an air vent on the chamber.

In another embodiment, an aseptic food processing system is provided. The system includes a heating apparatus, a holding apparatus, and a cooling device having a chamber configured to contain a first composition and an amount of air, tubing located within the chamber and configured to contain a second composition, and a sensor located within the chamber and configured to sense an amount of the first composition within the chamber. The amount of the first composition corresponds to a level of the first composition that is from about 75% to about 95% of a height of the chamber.

In another embodiment, a method of producing an aseptic food product is provided. The method includes heating a food composition in a heating apparatus to a predetermined temperature, holding the composition in a holding apparatus for a predetermined amount of time, and cooling the composition in a cooling device having a chamber configured to contain a first composition and an amount of air, tubing located within the chamber and configured to contain a second composition, and a level element located within the chamber and configured to maintain a predetermined amount of the first composition within the chamber. The predetermined amount of the first composition may correspond to a level of the first composition that is from about 75% to about 95% of a height of the chamber.

In an embodiment, the method further includes circulating the first composition through the chamber. At least a portion of the first composition may also be recirculated through the chamber.

In another embodiment, a method of producing an aseptic food product is provided. The method includes heating a composition in a heating apparatus to a temperature capable of killing any pathogenic microorganisms in the composition, holding the composition in a holding apparatus for a predetermined amount of time, and cooling the composition in a cooling device having a chamber configured to contain a first composition and an amount of air, tubing located within the chamber and configured to contain a second composition, and a sensor located within the chamber and configured to sense an amount of the first composition within the chamber. The amount of the first composition may correspond to a level of the first composition that is from about 75% to about 95% of a height of the chamber.

An advantage of the present disclosure is to provide an improved aseptic cooler.

Another advantage of the present disclosure is to provide improved heat exchangers.

Yet another advantage of the present disclosure is to provide improved systems for producing aseptic food products.

Still yet another advantage of the present disclosure is to provide improved methods for manufacturing aseptic food products.

Another advantage of the present disclosure is to provide improved methods for cooling aseptic food products having particles.

Another advantage of the present disclosure is to provide improved methods for cooling aseptic food products without particles.

Yet another advantage of the present disclosure is to provide improved methods for maintaining a coolant amount in an aseptic cooler.

Still yet another advantage of the present disclosure is to provide improved methods for monitoring a level of cooling media in an aseptic cooler.

Additional features and advantages are described herein, and will be apparent from the following Detailed Description and the figures.

BRIEF DESCRIPTION OF THE FIGURES

FIG. 2a and FIG. 2b show aseptic coolers of the prior art.

FIG. 3 shows an aseptic cooler and cooling system of the prior art.

FIG. 4 shows an aseptic cooler and cooling system in accordance with an embodiment of the present disclosure.

DETAILED DESCRIPTION

Figure 1:
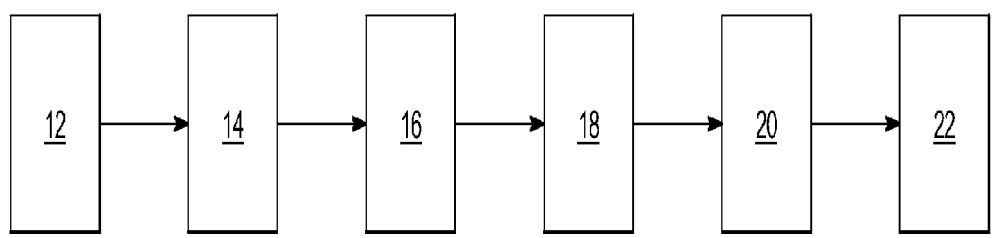
FIG. 1 is a schematic representation of an aseptic food processing system.

The present disclosure is generally related to a heat exchanger having an open chamber configuration. Specifically, the present disclosure is directed to an aseptic cooler having an open chamber configuration and including a level detecting device that is configured to maintain a level of cooling media in the aseptic cooler, while preventing the cooling media from pressurizing same. The open chamber configuration provides an air break at a top portion of the aseptic cooler that ensures that the cooling media entering the aseptic cooler is at, or close to, atmospheric pressure. Additional benefits and advantages of the present disclosure will be discussed further below.

Aseptic environments must be used for commercial food products that include both solid particulates and liquids that are sold through retail outlets. Examples of food products that must be processed in aseptic environments include, but are not limited to, dairy products such as whole milk, skim milk, cream, flavored milk, ice cream, yoghurt, etc. Fruit products such as, for example, orange juice, grapefruit juice, apple, juice, and other fruit juices may also require aseptic processing, as well as some sauces including, but not limited to cream-based sauces (e.g., alfredo sauce, béchamel sauce, etc.). Aseptic processing may also be required for food products including particulates. These types of food products may include dessert-type products such as, for example, blueberries in an apple puree, strawberries in a banana puree, or fruit particles in a yoghurt. Aseptic foods with particulates may also include meal-type products such as, for example, carrots, pasta or meatballs in a starchy base.

Generally speaking, aseptic food processing is carried out in four basic steps including heating, holding, cooling and packaging. More complex aseptic food processing can also include pre-heating and pre-cooling steps, depending on the configuration of the heating and cooling devices, respectively. A schematic of a basic aseptic food processing system 10 is shown in FIG. 1, which includes a pre-heating section 12, a heating section 14, a holding section 16, a pre-cooling section 18, and a cooling section 20. From cooling section 20, the food product is typically forwarded to a packaging section 22. To prevent contamination from outside sources during the food processing, the system is a closed system. Each of the sections of system 10 include apparatuses capable of achieving the goals of the respective processing section. For example, heating section 14 may have a heating apparatus or a heat exchanger for heating the product to a desired temperature. Similarly, cooling section 20 may have a cooling apparatus or a heat exchanger for cooling the product to a desired temperature.

The pre-heating stage may simply be a second heating stage that may be required to achieve a desired temperature of the food product. The necessity of a pre-heating stage may depend on the configuration of the apparatuses in the heating section. For example, if the apparatus used in the heating section is too long such that the food product is not properly heated (e.g., too hot or too cold), the apparatus may be replaced with an apparatus that is shorter and a pre-heating apparatus may be added to the system. In this regard, a pre-heating apparatus may serve as a first of two heating apparatuses in the system.

During the heating stage, the temperature of the food product is raised to a temperature that is high enough to kill any undesirable microorganisms that may be present in the food product. The food product is held at this temperature for an amount of time that is sufficient to destroy or eliminate undesirable microorganisms. Heating may be achieved by directly contacting the food product with a heat source (e.g., direct steam injection), or indirectly by conducting heat through a surface that contacts the food product. In an example, the food product may be heated to a temperature from about 200 to about 300° F. and may be heated at this temperature for anywhere from about 5 seconds to about 10 minutes, depending on the size and configuration of the apparatuses used to heat the food product. The food product may be heated using batch processes or using continuous processes, which may include the use of a heat exchanger, as mentioned above. With a heat exchanger, specific volumes of a food product are continuously moved past or through a heated media, which transfers heat from the heating media to the food product to destroy or eliminate undesirable microorganisms. There are several different types of heat exchangers, some of which will be described below.

The holding process is used to maintain the food product at an elevated temperature for a desired amount of time. The temperature of the holding process is typically similar to the temperature of the heating section, with slight possible variations (e.g., the holding temperature may be slightly less than the heating temperature). Similarly, the time spent in the holding section may be similar to the time spent in the heating section. Typically, holding times are rather complex to determine and can depend on several factors including, but not limited to product flow rates, product heating/cooling curves, food product flow patterns, etc. A combination of the heating and holding processes is selected to achieve a desired level of microbial elimination. Indeed, most of the heat treatment of an aseptic food product is achieved in the holding process. Upon completion of the holding stage, the food product is considered to be sterile.

The pre-cooling stage may simply be a second cooling stage that may be required to achieve a desired temperature of the food product. The necessity of a pre-cooling stage may be similar to that of a pre-heating stage and may depend on the configuration of the apparatuses in the cooling section. For example, if the apparatus used in the cooling section is too long such that the food product is not properly cooled (e.g., too hot or too cold), the apparatus may be replaced with an apparatus that is shorter and a pre-cooling apparatus may be added to the system. In this regard, a pre-cooling apparatus may serve as a first of two cooling apparatuses in the system. The pre-cooling and cooling sections of an aseptic food processing system may use food grade coolants including, but not limited to propylene glycol, water, ethylene glycol, salt brine, synthetic hydrocarbon base chemicals from the polyalphaolefin family, and refined vegetable extracts coolant, or combinations thereof.

The cooling stage is typically the final processing stage before the aseptic food product is packaged. The cooling stage prevents unnecessary organoleptic degradation due to heating after a desired level of microbial elimination has been achieved. Cooling may be performed in a number of different processes, which include, but are not limited to, dissipation of heat through the holding section, or refrigeration, or use of lower temperature coolants. In an embodiment, the food product is typically cooled to a temperature that is less than 100° F. during cooling. Typically, the product is cooled to a temperature of about 80° F. Rapidly cooling a food product ends heat treatment, which can slow or stop any alteration to organoleptic properties or elimination of microorganisms. Alternatively, slow cooling allows for a longer period of time to continue elimination of microorganisms, which also, unfortunately, results in increase levels of molecular denaturation or loss of organoleptic properties. Aseptic food processing typically employs rapid heating and rapid cooling processes. The food product typically resides in a cooling device for a time period from about 1 minute to about 5 minutes, depending on the size and configuration of the cooling device. In an embodiment, the food product resides in a cooling device for about 3 minutes.

After the food product is sufficiently cooled, the product continues on to an aseptic packaging section. Aseptic packaging requires the use of sterilized containers, filling the sterilized containers under sterile conditions, and hermetically sealing the aseptic containers. The use of such aseptic packaging is generally known to extend the shelf life of a food product, which is an advantageous, cost-saving measure for companies that were previously required throw away unsold, expired food products from retail shelves.

As mentioned above, aseptic food processing systems may include the use of heat exchangers. Heat exchangers may be used during any step in the food processing such as, for example, pre-heating, heating, holding, pre-cooling, or cooling. There are several different types of heat exchangers that may be used in these types of processes. For example, a first type of heat exchanger is a plate heat exchanger, which uses very thin, corrugated, heat-conductive plates with a heating media on one side and liquid food product traveling through the exchanger on the other side. A plate heat exchanger uses a variety of flow patterns to pass product over the plates and, as a result, the product closest to the surfaces of the heat exchanger will heat much faster than product further away. As such, plate heat exchangers have a tendency to cook or to burn the food product on the heat exchanger surfaces, which can degrade the organoleptic properties of the food product and negatively affect the performance of the heat exchanger.

A second type of heat exchanger is a scraped surface heat exchanger, which has blades that scrape the heated surfaces in order to remove product and to avoid prolonged heat exposure. The product side is scraped by blades attached to a moving shaft or frame, and the blades are typically made of a rigid plastic material to prevent damage to the scraped surface. There are basically three types of scraped surface heat exchangers, depending on the arrangement of the blades. The first type is rotating, tubular, where the shaft is placed parallel to the tube axis, not necessarily coincident, and spins at various frequencies. The second type is reciprocating, tubular, where the shaft is concentric to the tube and moves longitudinally without rotating. The third type is rotating, plate, where the blades wipe the external surface of circular plates arranged in series inside a shell. The heating/cooling fluid runs inside the plates. Other types of heat exchangers include, for example, adiabatic wheel, plate fin, pillow plate, fluid, waste heat recovery units, phase-change, and the most common of heat exchangers, the shell and tube heat exchanger.

A tube and shell heat exchanger includes a set of tubes in a container called a shell, or a chamber. The fluid flowing inside the tubes (e.g., a food product) is called the tube-side fluid, while the fluid flowing on the outside of the tubes (e.g., a heating or cooling media) is called the shell-side fluid. The tubes provide the heat transfer surface between the tube-side fluid and the shell-side fluid. The tubes may be seamless or welded and are commonly constructed from copper or steel alloys. Other alloys of nickel, titanium, or aluminum may also be used. The tubes may also have any shape or configuration known in the art. For example, the tubes may have a shape that is linear, helical (e.g., coiled), serpentine, or combinations thereof.

The tubes are generally held in place by being inserted into the holes of a tube sheet, which is typically a single round plate of metal. The tube sheets serve not only to hold the tubes in place inside the shell, but also to separate the tube-side fluid from the shell-side fluid in a sealed manner. In addition to mechanical requirements of the tube sheet, the tube sheet must also be able to withstand corrosive attack by both fluids in the heat exchanger and must also be electrochemically compatible with the tube and tube-side fluids. The tube sheets may be made, for example, from low carbon steel with a thin layer of corrosion-resistant alloy metallurgically bonded to one side.

The shell, or chamber, of the heat exchanger is simply a container for the tubes and shell-side fluid. The shell typically has a cylindrical shape with a circular cross-section, but the skilled artisan will appreciate that the shell may have any size and shape known in the art, so long as the shell is able to contain the tubing and a shell-side fluid. Shells are commonly made by rolling a metal plate into a cylinder, and are typically formed from low carbon steel, although other alloys can be and are used when corrosion or high temperature strength demands are required.

Additionally, baffles may be inserted into the shell and can serve at least two functions. First, the baffles can support the tubes in the proper position during assembly and operation, and prevent vibration of the tubes during operation. Second, the baffles can guide the shell-side fluid back and forth across the tubes as the shell-side fluid moves from a shell-side fluid inlet of the shell to a shell-side fluid outlet of the shell. This guiding mechanism helps to increase the velocity and the heat transfer coefficient of the system.

In addition to the tubes, tube sheets, shells, and baffles, the heat exchangers may also include tube-side channels and nozzles to control the flow of the tube-side fluid into and out of the tubes, channel covers that bolt to channel flanges, and pass dividers for heat exchangers having two tube-side passes.

Like most devices exposed to high flow rates and high mechanical stresses, heat exchangers are susceptible to failure and, as a result, contamination of the food product contained therein. Indeed, even a pin-sized hole in the wall of the tubes can cause contamination of a large portion of the food product being processed. Any breach of a scheduled process for the above-described food process or packaging system could mean that the affected product must be destroyed, reprocessed, or segregated and held for further evaluation. Loss of sterility during production can cause downtimes lasting from a few hours to a few days in length.

Entry of microorganisms into the food product can occur at product coolers, aseptic surge apparatus, flow diversion valves, homogenizers, aseptic pumps, or any other equipment that is downstream from the holding section. However, contamination typically occurs at the walls of the tubes during pre-cooling or cooling of the food product. In this regard, points of weakness may arise in the walls of the tubes for various reasons including, but not limited to corrosion, erosion, or mechanical/material stress. For example, typical heat exchangers may have several portions of the inner tubing that are welded to the outer shell. At the ends of the tubes, the tube-side fluid may be separated from the shell-side fluid by the tube sheets. The welding can place stress on the tubing when the tubing expands due to the introduction of a hot, heat treated food product. This expansion can result in failure of the weld and possible leakage of the cooling media into the food product carried within the tubing.

In aseptic food processing systems, one way to combat product contamination is to maintain a pressure differential between the tube-side fluid and the shell-side fluid. Indeed, in the United States, the Food & Drug Administration ("FDA") requires a mechanism to monitor and guarantee higher pressure on the product side of an aseptic heat exchanger than on the cooling media side. This pressure difference serves at least two purposes. First, the heat exchanger tubes can generally be made to withstand higher pressures than the shell of the heat exchanger for a much lower cost. Second, the pressure differential prevents any shell-side fluid (e.g., cooling media) from entering the product tube in case of a tube leak. In this regard, any pinhole or leak that might occur in the tube walls would permit leakage of the tube-side fluid (e.g., food product) to be in the direction from the tube-side fluid to the shell-side fluid, thereby preventing contamination of the food product by the heating/cooling media.

Consequently, maintaining low pressure on a high flow shell fluid side is a challenge because many systems rely on product back pressure valves to increase the pressure on the tube fluid side to a level that exceeds the pressure on the shell fluid side. The use of back pressure valves is encouraged when running water as the tube-side fluid, but is difficult to control when running a food product as the tube-side fluid. Furthermore, back pressure valves can challenge the system capabilities as a pressure increase at an aseptic cooler directly translates into higher pressures at upstream processing points.

For purposes of illustrating how a shell and tube heat exchanger works, FIG. 2a shows a common shell and tube heat exchanger 24 of the prior art. Although the illustrated heat exchanger 24 may be used at any stage in an aseptic food processing system, as mentioned briefly above (e.g., to transfer heat to a food product as in a sterilization process), the remainder of the present disclosure will refer to the heat exchanger as an aseptic cooler wherein the shell contains a coolant or cooling media and is used in a cooling section of an aseptic food process.

As is shown in FIG. 2a, cooling media may enter shell 26 through a shell fluid inlet 28 at a top portion of shell 26, traverse the exterior of tubes 30 (e.g., coils) and interior of shell 26, and exit shell 26 at the shell fluid outlet 32 at a bottom portion of shell 26. In a similar manner, sterilized food product may enter tubes 30 through a tube fluid inlet 34 at the bottom portion of shell 26, traverse the interior of tubes 30, and exit tubes 30 at a tube fluid exit 36 at a top portion of shell 26.

FIG. 2b shows another common shell and tube heat exchanger 124 of the prior art. Although the illustrated heat exchanger 124 may be used at any stage in an aseptic food processing system, as mentioned briefly above (e.g., to transfer heat to a food product as in a sterilization process), the remainder of the present disclosure will refer to the heat exchanger as an aseptic cooler wherein the shell contains a coolant or cooling media and is used in a cooling section of an aseptic food process.

As is shown in FIG. 2b, cooling media may enter shell 126 through a shell fluid inlet 128 at a top portion of shell 126, traverse the exterior of tubes 130 and interior of shell 126, and exit shell 126 at the shell fluid outlet 132 at a bottom portion of shell 26. In a similar manner, sterilized food product may enter tubes 130 through a tube fluid inlet 134 at the bottom portion of shell 126, traverse the interior of tubes 130, and exit tubes 130 at a tube fluid exit 136 at a top portion of shell 126.

The aseptic tubular coolers of the prior art have typically been used in aseptic systems commonly referred to as a "feed and bleed systems," an example of which is illustrated as system 38 in FIG. 3. These types of systems work by recirculating cooling media through the shell for heat transfer. For example, in these systems, a centrifugal pump 40 is usually placed next to heat exchanger 42, with the suction side coming out of the bottom and discharging from the top. Such recirculation pressurizes the media on the shell-side after the air vent 46 discharges all air contained within the shell-side prior to operation.

System 38 further includes a temperature sensing device 48 for sensing a temperature of an output product. When the product outlet temperature is higher than the desired set point, some of the circulating cooling media bleeds out to the cooling media return line by use of an automatic control valve 50. The amount of cooling media that was bled out of the shell-side is immediately replaced with cold cooling media supplied from the cooling media supply line. In recirculation systems, some or all of the circulating media may be bled out to the cooling media return line. Similarly, some or all of the circulating media may be bled out of the system entirely. The recirculation paths are further controlled by check valve 52 and valves 54, 56. The drawback of this design is that pump 40 pressurizes shell 44 during recirculation of the cooling media, which floods shell 44.

To avoid the drawbacks and pitfalls of the prior art systems, the present disclosure provides aseptic coolers and systems including same having an open chamber configuration with a device for determining the amount of shell fluid (e.g., coolant or cooling media) within the cooler. The aseptic coolers of the present disclosure may be heat exchangers and may be used in the cooling section of an aseptic food processing system. The advantage of such system is that it works on an open chamber premise, where a liquid measurement device is used to maintain enough cooling media in the chamber, while also avoiding pressurizing of the shell, or chamber due to, at least in part, flooding of the shell fluid with cooling media. In the systems of the present disclosure, the level of cooling media in the shell of the heat exchanger is kept close to the top of the shell but an air break exists between the cooling media outlet at the top of the shell and the level of the cooling media in the shell. This air break ensures that the pressure of cooling media entering the shell is at, or close to, atmospheric pressure. In this regard, cooling media is introduced into air at atmospheric pressure at the top of the shell, instead of introducing cooling media into a shell flooded with cooling media, which creates pressure within the shell.

Additionally, the pressure of cooling media at the cooling media outlet of the heat exchanger is maintained at atmospheric pressure, or even lower depending on the speed of the centrifugal pump that recirculates the cooling media. As such, the maximum amount of pressure exerted by the cooling media in the shell is equal to, or less than, the head height pressure of the cooling media, which is much lower than the pressure exerted by the cooling media in a shell flooded with cooling media. Overall, this arrangement ensures that the pressure differential between the tube fluid (e.g., aseptic food product) and the shell fluid (e.g., cooling media) is maximized at the top and bottom portions of the heat exchanger.

For example, FIG. 4 illustrates a system 58 of the present disclosure that includes heat exchanger 60 having shell 62 and tubing 64. System 58 further includes pump 66, air vent 68, temperature sensing device 70, valves 72, 74 and liquid measurement device 76 located on an interior of shell 62. In operation, cooling media is introduced into system 58 via two-way valve 74, which transports the cooling media to a cooling media inlet 78. Simultaneously, or at about the same time, aseptic food product is introduced into system 58 via a product inlet 80 of shell 62. The cooling media travels downward through shell 62 toward cooling media outlet 82 and is removed from shell 62 by the suction of pump 66. In contrast, the aseptic food product travels in an upward direction through tubing 64 toward product outlet 84 of shell 62. This counter-current flow of the cooling media and the aseptic food product is more efficient than, for example, a parallel flow of the cooling media and the aseptic food product because the counter-current flow transfers more heat from the aseptic food product to the cooling media.

As the cooling media and the aseptic food product flow through heat exchanger 62, the temperature of the cooling media will increase due to the transfer of heat between the two fluids. When heat transfer begins to diminish to the point that the product outlet temperature, as measured by temperature sensing device 70, is higher than a predetermined temperature, temperature sensing device 70 can communicate with a programmable logic controller to open two-way valve 74 to allow some fresh, cold cooling media into system 58.

As the fresh, cold cooling media is introduced into shell 62 via cooling media inlet 78, the level of cooling media in shell 62 will begin to rise. This rise in the level of cooling media is detected by level measurement device 76, which is located on an interior of shell 62. The skilled artisan will recognize several different types of level measurement devices that may be used in the present disclosure. In an embodiment, level measurement device 76 is a capacitance level sensor that may be used for continuous level measurement of the cooling media. The capacitance level sensor may be a rod-like capacitance sensor that detects a change in capacitance due to a change in the level of a liquid to which the capacitance level sensor is exposed. Capacitance level sensor may project downward from an interior, top wall of shell 62 and may extend into shell 62 by a distance that is a percentage of the height of shell 62, measuring from a top wall of shell 62 and downward, and wherein a bottom wall of shell 62 is 100% of the shell height. For example, level sensor may extend downward into shell 62 a distance that is about 15% to about 90% of the height of shell 62. Level sensor may also extend downward into shell 62 a distance that is about 20% to about 80% of the height of shell 62. In an embodiment, level sensor may extend downward into shell 62 a distance that is about 50% of the height of shell 62. The skilled artisan will appreciate that the desired distance that the level sensor extends into shell 62 will determine how long the level sensor will be.

In embodiments that use a capacitance level sensor, the capacitance level sensor may include a ground tube substantially surrounding the capacitance level sensor. The ground tube may serve at least two purposes. First, the ground tube can serve to ground the capacitance level sensor when the capacitance level sensor is used with containers that do not conduct electricity (e.g., plastic containers). Second, the ground tube can act as a protective sheath to surround the capacitance level sensor, while allowing cooling media to occupy the space between the capacitance level sensor and the surrounding ground tube. In this manner, the ground tube protects the capacitance level sensor from exposure to splashing of cooling media resulting from turbulent flow within shell 62, and which can result in false readings of cooling media levels in shell 62.

In operation, the capacitance level sensor is placed into shell 62 and is calibrated to communicate with a programmable logic controller when the level of cooling media inside shell 62 rises to a predetermined level, which also corresponds to an amount of air break desired in shell 62. For example, if the desired level of cooling media in shell 62 is at a level that is approximately 95% of a height of shell 62, measured from the bottom of shell 62, that level may correspond to a location that is approximately 60% of a length of capacitance level sensor, measured from the bottom-most tip of the sensor. This level may also correspond to a desired volume of air within shell 62. For example, tubes 64 occupy a percentage of the total volume within shell 62. If the cooling media occupies a volume of shell 62 that corresponds to a level that is approximately 95% of a height of shell 62, a finite volume of the interior of shell 62 is left for air to occupy. In an embodiment, air occupies from about 5% to about 35% of the total volume of an interior of shell 62. In another embodiment, air occupies from about 10% to about 20% of the total volume of an interior of shell 62. In yet another embodiment, air occupies about 15% of the total volume of an interior of shell 62.

When the level of cooling media in shell 62 rises to 95% of the height of shell 62, which corresponds to 60% of a length of capacitance level sensor, capacitance level sensor will cooperate with three-way valve 72 via a programmable logic controller to divert a portion of the cooling media outlet from shell 62 to a cooling media outlet pathway 86 instead of a recirculation pathway 88 that leads back to shell 62. Such a diversion will lower the level of cooling media in shell 62. When the level of cooling media in shell 62 reaches an acceptable level, the sensor may cooperate with three-way vale 72 via a programmable logic controller to divert a portion of the cooling media outlet from shell 62 to recirculation pathway 88 that leads back to shell 62, instead of cooling media outlet pathway 86 that expels cooling media from system 58.

In another embodiment, the level sensor is a radar sensor. In another embodiment, the level sensor is a guided radar sensor. In another embodiment, the level sensor is an ultrasonic sensor. In another embodiment, the level sensor is a hydrostatic pressure element. In another embodiment, the level sensor is a differential pressure element, in one embodiment, the pressure of the first composition is measured at a location where the first composition pressure is at its highest value & the pressure of the second composition is measured at the location where the second composition pressure is at its lowest value. In another embodiment, the level sensor is a radiometric sensor. The skilled artisan will immediately appraciate that more than one type of level sensor maybe used.

The skilled artisan will immediately appreciate that the desired amount of air break at the top, interior portion of shell 62 will determine the predetermined level of cooling media required to activate three-way valve 72. For example, a predetermined level of cooling media may correspond to a distance that is about 50% to about 95% of a height of shell 62, measured from the bottom of shell 62. In another embodiment, a predetermined level of cooling media may correspond to a distance that is about 75% to about 95% of a height of shell 62. In another embodiment, a predetermined level of cooling media may correspond to a distance that is about 80% to about 90% of a height of shell 62. In another embodiment, a predetermined level of cooling media may correspond to a distance that is about 85% of a height of shell 62. As above the remaining length of the height of shell 62 may correspond to a specific volume of air in shell 62.

The skilled artisan will also appreciate that the predetermined level of cooling media will not only correspond to a percentage of the height of shell 62, but will also correspond to a percentage of the length of capacitance level sensor, as mentioned above. For example, the predetermined level of cooling media contained in shell 62 may correspond to about 40% to about 80% of the length of capacitance level sensor, measured from a bottom tip of capacitance level sensor. In another embodiment, the predetermined level of cooling media contained in shell 62 may correspond to about 50% to about 70% of the length of capacitance level sensor. In another embodiment, the predetermined level of cooling media contained in shell 62 may correspond to about 60% of the length of capacitance level sensor.

In another embodiment, level measurement device 76 is a sensor (not shown) that is capable of detecting the presence of the cooling media and/or the pressure of cooling media within shell 62. In this embodiment, the sensor may be located on an interior, side wall of shell 62 at a location corresponding to a desired level of cooling media in shell 62. For example, if a desired level of cooling media in shell 62 corresponds to a location that is approximately 95% of the height of shell 62, measured from a bottom of shell 62, a sensor may be placed on an interior, side wall of shell 62 at the same location. If the level of cooling media in shell 62 rises to the level of the sensor, the sensor may cooperate with three-way valve 72 via a programmable logic controller to divert a portion of the cooling media outlet from shell 62 to cooling media outlet pathway 86 instead of to recirculation pathway 88 that leads back to shell 62. Such a diversion will lower the level of cooling media in shell 62. When the level of cooling media in shell 62 reaches an acceptable level, the sensor may cooperate with three-way vale 72 via a programmable logic controller to divert a portion of the cooling media outlet from shell 62 to recirculation pathway 88 that leads back to shell 62, instead of to cooling media outlet pathway 86 that expels cooling media from system 58. The sensor may be configured to determine the level of cooling media in shell 62, sense a pressure within shell 62, or both.

Another benefit and advantage of the present aseptic coolers and systems, lies in the modulation of the temperature of the cooling media as it enters heat exchanger 60. This modulation is accomplished by mixing fresh, cold cooling media with cooling media that has been circulating through heat exchanger 60 and is recirculated through recirculation pathway 88. By combining fresh, cold cooling media with recirculated media, the temperature of the cooling media is modulated (e.g., increased slightly above the temperature of fresh cooling media) so as to prevent shocking the warm or hot product with too cold of a temperature, which can cause formation of a stagnant layer of product at the wall of tubing 64. Such a stagnant layer not only decreases the efficiency of heat exchanger 60 dramatically, but also alters the aseptic food product characteristics to an extent that it negatively affects the product quality and organoleptic properties of same.

In view of the present disclosure, the skilled artisan will appreciate that methods of using the above-described aseptic coolers are also provided. For example, in an embodiment, methods of producing an aseptic food product are provided. The methods may include heating a food composition in a heating apparatus to a predetermined temperature, holding the composition in a holding apparatus for a predetermined amount of time, and cooling the composition in a cooling device having a chamber configured to contain a first composition and an amount of air, tubing located within the chamber and configured to contain a second composition, and a level element located within the chamber and configured to maintain a predetermined amount of the first composition within the chamber. The predetermined amount of the first composition may correspond to a level of the first composition that is from about 75% to about 95% of a height of the chamber.

The methods may further include circulating the first composition through the chamber. At least a portion of the first composition may also be recirculated through the chamber.

In another embodiment, methods of producing an aseptic food product are provided. The methods may include heating a composition in a heating apparatus to a temperature capable of killing any pathogenic microorganisms in the composition, holding the composition in a holding apparatus for a predetermined amount of time, and cooling the composition in a cooling device having a chamber configured to contain a first composition and an amount of air, tubing located within the chamber and configured to contain a second composition, and a sensor located within the chamber and configured to sense an amount of the first composition within the chamber. The amount of the first composition may correspond to a level of the first composition that is from about 75% to about 95% of a height of the chamber. The skilled artisan will immediately appreciate that the first composition may correspond to a level of the first composition that is from about 20% to about 95% of a height of the chamber a height that can be establishing based on process needs.

Accordingly, the present disclosure provides the benefit of maximizing pressure differential between the product side and the cooling media side of an aseptic cooling heat exchanger, while maintaining a modulated cooling media temperature inside the heat exchanger.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A heat exchanger for a food product, compromising:
   a shell having a first end, a second end, and a cooling media receiving chamber, the first end having a cooling media inlet, a food product outlet, and an air vent, the second end having a cooling media outlet and a food product inlet;
   a tubing for transporting the food product, the tubing disposed within the cooling media receiving chamber of the shell and extending between the food product inlet and the food product outlet of the shell;
   a source of a cooling media;
   a cooling media inlet pathway for transporting the cooling media from the source of the cooling media to the cooling media inlet of the shell;
   a recirculation pathway for transporting the cooling media from the cooling media outlet to the cooling media inlet;
   a cooling media outlet pathway for expelling the cooling media from the recirculation pathway;
   a first valve interposed in the cooling media inlet pathway so as to selectively control the flow of cooling media from the source of cooling media to the cooling media receiving chamber of the shell;
   a temperature sensing device in communication with the tubing downstream of the food product outlet and with the first valve such that when the temperature of the food product flowing from the shell exceeds a predetermined temperature, the first valve is actuated to permit cooling media to flow from the source of cooling media to the cooling media receiving chamber via the cooling media inlet pathway;
   a second valve interposed at an intersection of the cooling media recirculation pathway and the cooling media outlet pathway to selectively control the flow of cooling media from the cooling media receiving chamber to one of the cooling media recirculation pathway and the cooling media outlet pathway; and
   a level element in communication with the cooling media receiving chamber and the second valve such that when the level of the cooling media in the cooling media chamber exceeds a predetermined level, the second valve is actuated to divert the flow of the cooling media from the cooling media recirculation pathway to the cooling media outlet pathway,
   wherein the predetermined level of the cooling media is from about 75% to about 95% of a height of the cooling media receiving chamber, as measured from the second end to the first end so that the pressure within the cooling media receiving chamber is substantially equal to atmospheric pressure as the cooling media from the cooling media source flows into the cooling media receiving chamber.

2. The heat exchanger according to claim 1, wherein the predetermined level of the cooling media is from about 80% to about 90% of the height of the cooling media receiving chamber.

3. The heat exchanger according to claim 1, wherein the level element is at least one of: a capacitance level element, a grounded level element, radar, guided radar, ultrasonic, hydrostatic pressure, differential pressure element, radiometricor element, a combination thereof.

4. The heat exchanger according to claim 1, wherein the heat exchanger is an aseptic cooler.

5. The heat exchanger according to claim 1, wherein the cooling media is a food grade coolant selected from the group consisting of water, propylene glycol, ethylene glycol, salt brine, synthetic hydrocarbon base chemicals from the polyalphaolefin family, refined vegetable extracts coolant and combinations thereof.

6. The heat exchanger according to claim 1, wherein the food product comprises particulates.

7. The heat exchanger according to claim 1, wherein the tubing comprises a shape that is selected from the group consisting of linear, helical, serpentine, and combinations thereof.

8. The heat exchanger according to claim 1, further comprising a pressure sensor in communication with the cooling media receiving chamber to sense an amount of pressure within the cooling media receiving chamber.

* * * * *